United States Patent [19]

Windsor

[11] Patent Number: 5,644,655
[45] Date of Patent: Jul. 1, 1997

[54] IDENTIFICATION METHOD AND APPARATUS

[75] Inventor: Colin George Windsor, Goring, United Kingdom

[73] Assignee: United Kingdom Atomic Energy Authority, Didcot, United Kingdom

[21] Appl. No.: 433,046

[22] Filed: May 3, 1995

[30] Foreign Application Priority Data

May 13, 1994 [GB] United Kingdom ............... 9409773

[51] Int. Cl.$^6$ ................................................. G06K 9/62
[52] U.S. Cl. ................................................. 382/209
[58] Field of Search ................................. 382/115, 116, 382/118, 119, 123, 181, 190, 186, 187, 195, 198, 199, 200, 203, 204, 209, 217, 218

[56] References Cited

U.S. PATENT DOCUMENTS

| | | | |
|---|---|---|---|
| 4,771,469 | 9/1988 | Wittenburg | 382/25 |
| 5,040,222 | 8/1991 | Muroya | 382/3 |
| 5,251,265 | 10/1993 | Döhle et al. | 382/3 |
| 5,317,650 | 5/1994 | Harrington | 382/22 |
| 5,343,537 | 8/1994 | Bellegarda et al. | 382/13 |
| 5,432,864 | 7/1995 | Lu et al. | 382/118 |

*Primary Examiner*—Jose L. Couso
*Attorney, Agent, or Firm*—William R. Hinds

[57] ABSTRACT

A method of comparing two nominally identical entities each of which can be represented by an assembly of arcs, comprising the operations of producing images of the entities, analysing each of the images into an assembly of arcs, producing respective data sets representative of the arcs in the assemblies, using the data sets to map one assembly of arcs onto the other, determining differences in the mapping related to differences between the images, comparing the determined differences in the mapping between the images with statistically determined differences in the mapping between a plurality of authentic images to establish a criterion of an acceptable level of probability of identity between the said two entities and providing an indication of the acceptance or rejection of the proposition that the two entities are identical.

6 Claims, 6 Drawing Sheets

Strain energy 235

Genuine

Strain energy 326

Forged

IDENTIFICATION METHOD AND APPARATUS

The present invention relates to the establishment of the relationship between two entities, and more specifically to the detection of fraud or the verification of the identity of a person. For the purposes of this specification, fraud is defined as the use of a false representation to gain some advantage. Examples are the forgery of signatures on cheques or other documents which form part of a transaction, such as a bill of sale or a letter of credit, or seeking to gain admission by means of false or stolen identification documents to premises or property to which access normally is restricted.

Particularly common types of fraud are the obtaining of goods, services or money by means of forged signatures on stolen cheques or credit cards. Large sums of money are lost annually in this way by banks and other institutions. Security cards or passes often have signatures on them also; in addition they may have a photograph of the person to whom the pass was issued.

Methods have been proposed for verifying signatures by comparing the dynamics of the writing of a purported signature with stored data representative of the dynamics of the writing of an authentic reference signature. See, for example, our co-pending application GB 2,252,391A; EP application 0 392 159 and U.S. Pat. No. 4,701,960. Also, methods have been proposed for comparing the shape of a purported signature after it has been written with that of a stored authentic signature. See, for example, EP application 0,483,391 and EP 0 127 478B.

Also it has been proposed to provide human face recognition by digitising images and comparing them using pattern recognition techniques. However, it is believed that no such system is available for use in day-to-day circumstances.

According to the invention in one aspect there is provided a method of comparing two nominally identical entities each of which can be represented by an assembly of arcs, comprising the operations of producing images of the entities, analysing each of the images into an assembly of arcs, producing respective data sets representative of the arcs in the assemblies, using the data sets to map one assembly of arcs onto the other, determining differences in the mapping related to differences between the images, comparing the determined differences in the mapping between the images with statistically determined differences in the mapping between a plurality of authentic images to establish a criterion of an acceptable level of probability of identity between the said two entities and providing an indication of the acceptance or rejection of the proposition that the two entities are identical.

The operation of using the data sets to map one entity upon the other may comprise reproducing representations of the assemblies of arcs from the data sets and mapping one set of reproduced arcs upon the other in such a manner as to maximise the correlation between the representations of respective arcs in the assemblies of arcs while simultaneously minimising the elastic distortions in the mapping between the representations of the arcs.

The mapping between the plurality of authentic images to produce the statistically determined differences between the authentic images to establish the criterion of an acceptable level or probability of identity between the two entities is done in the same manner as that between the two assemblies of arcs.

According to the invention in a second aspect, there is provided an apparatus for comparing two entities and providing an indication of the probability of the identity of the two entities, wherein there is included means (73) for producing electronically an image in the form of an array of binary pixels of one entity to be compared with another entity an image of which also has been electronically produced in the form of binary pixels, means (74) for producing from the pixels related to the image of the first entity a data set related to arcs contained in the pixels related to the image of the first entity, a data set store (71) containing a data set related to arcs contained in the pixels corresponding to the image of the second entity, means (75) for reproducing the arcs represented by the respective data sets and mapping the reproduced arcs relating to one image upon those relating to the other and determining the differences therebetween, means (77) for comparing the determined differences between the two images with a standard set of differences determined statistically by repeated comparisons between images of one of the entities so as to provide a criterion of an acceptable level of probability of identify between the entities, and means for providing an indication of the acceptance or rejection of the proposition that the two entities are identical.

According to the invention in another aspect there is provided an apparatus for comparing two entities and providing an indication of the probability of the identity of the two entities wherein there is included means for electronically scanning images of the two entities and providing arrays of binary pixels related thereto, means for scanning the arrays of pixels and deriving data sets relating to arcs contained in respective arrays of pixels, means for reproducing the arcs represented by the data sets, and mapping the reproduced arcs relating to one image upon the other and determining the differences therebetween, means for comparing the determined differences between the two images with a standard set of differences determined statistically by repeated comparisons between images of one of the entities so as to provide a criterion of an acceptable level of probability of identity between the two entities, and means for providing an indication of the acceptance or rejection of the proposition that the two entities are identical.

The entities to be compared may be signatures or images of faces or other features of a person which can be resolved into a set of arcs, such as ears.

The invention will now be described, by way of example, with reference to the accompanying drawings, in which FIG. 1 illustrates how a set of parameters defining an arc can be derived.

Figure 1:
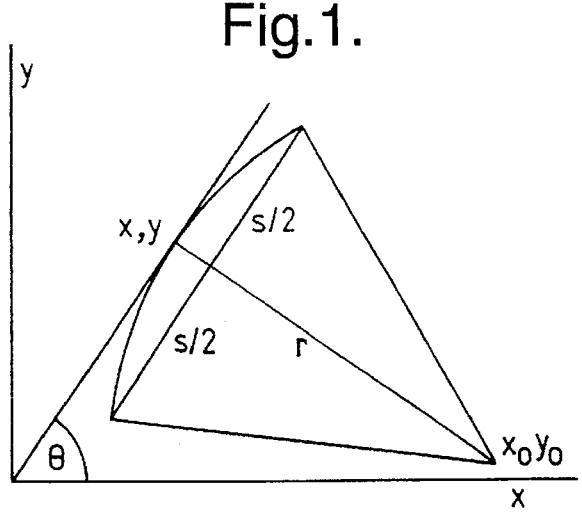

Referring to the drawings, FIG. 1 shows how a circular arc can be characterised by five variables. Two are the position (x,y) of its central point, a third is the angle $\Theta$ of the tangent to the arc at the point (x,y), a fourth is the curvature of the arc, which may be positive or negative depending upon which side of the arc its centre of curvature $(x_c, y_c)$ lies, and the fifth is the chordal length of the arc.

Figure 2:
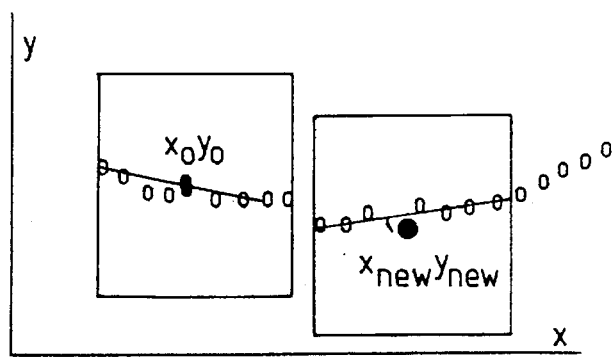
FIG. 2 illustrates how best fitting lines to a sequence of pixels representative of a portion of an arc can be derived so as to provide a data set related to the arc.

A process for extracting an arc from a signature or from an image of a face is illustrated in FIG. 2, which shows a section from a signature magnified to show the individual black pixels recorded during a scan of the signature or image. A pixel with co-ordinates $(x_o, y_o)$ is chosen at random and a box having a size about twice the thickness of the line represented by the pixels and centred upon the pixel $(x_o, y_o)$ is constructed around it. A best fit straight line to the pixels in the box is found using standard analytical techniques. This line defines a first segment of an extracted arc, and enables an estimate to be made for the position $(x_{new}, y_{new})$ of a similar box including another portion of the line represented by the pixels. A best fit straight line to this portion of the line represented by the pixels yields another possible segment of the arc. This new best fit straight line is accepted as forming part of the arc if the following criteria are satisfied.

1) The new line contains at least enough pixels to be a line of the expected width.

2) The new line joins onto the previous one with a displacement of less than half the line width.

3) The new line has an angle with reference to the previous one which is consistent with a curve of constant curvature to within some pre-determined value. ±10 degrees being a suitable range.

If any of the best fitting straight lines is accepted as representing part of an arc, then the corresponding pixels are removed from the image so as to prevent their use a second time. As successive fitting operations are carried out, the representation of the original arc is extended until one of the above-mentioned criteria fails to be satisfied, either because the arc has come to an end or because its curvature has changed markedly. The arc representation, or extraction process is then carried out in the reverse direction. If the extracted arc exceeds a pre-determined length, then its parameters, as given above, are recorded and the process is repeated on another part of the image of the signature or face.

Figure 3:
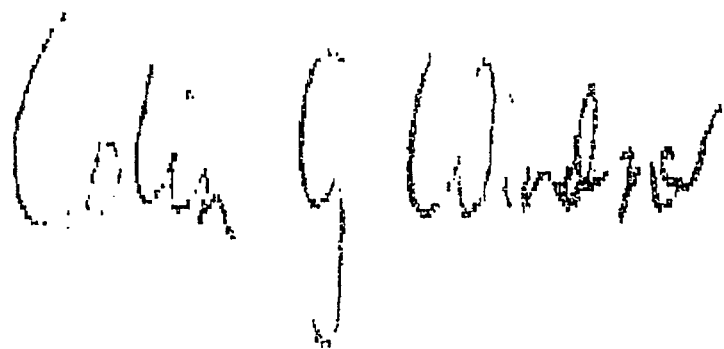
FIG. 3 shows a scanned image of a signature to provide an image of the signature in the form of sequences of binary pixels.
Figure 4:
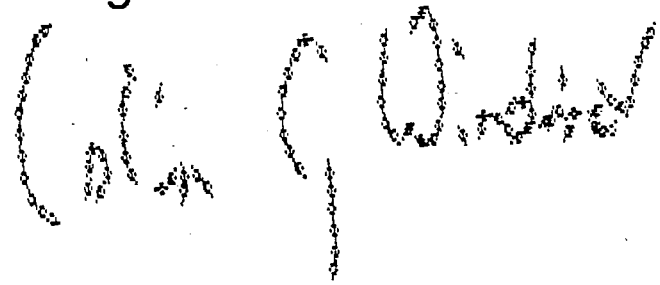
FIG. 4 shows best fitting lines to arcs contained in the signature of FIG. 3.
Figure 4:
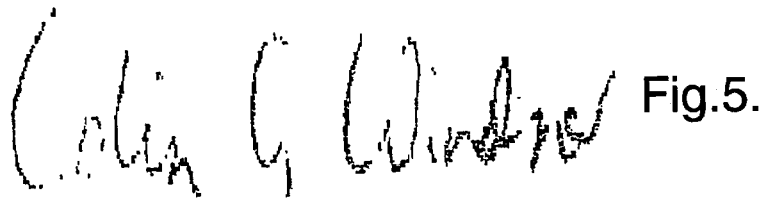
Figure 5:
FIG. 5 shows arcs reconstructed from the best fitting lines of FIG. 4, together with the image of the signature shown in FIG. 3.
Figure 6:
FIG. 6 shows a comparison between arcs extracted from a given signature compared with an authentic second writing of the same signature, together with a second comparison between arcs generated from the same signature and a forgery of it.
Figure 6:
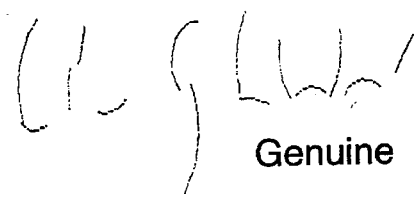
Figure 6:
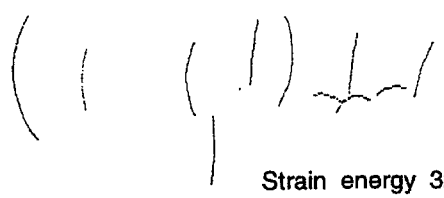
Figure 6:
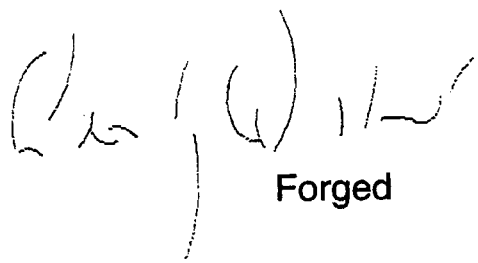

FIG. 5 shows the best fitting lines found from the image of a signature shown in FIG. 3, and FIG. 6 shows a set of arcs extracted from the best fitting lines of FIG. 5, together with the original of the signature shown in FIG. 3. It can be seen that the set of extracted arcs reproduces to a considerable extent the original signature.

FIG. 6 shows a comparison between a set of arcs extracted from a signature and a set of arcs extracted from another signature written by the same person. FIG. 6 shows also, a comparison between the sets of arcs extracted from the original set with those extracted from an attempted copy of the signature written by another person. As can be seen, the difference between the two sets of extracted arcs is very marked in the second case.

It can be seen also that, even in the case of two authentic signatures, there is a considerable difference between the corresponding sets of arcs. In a practical system for verifying signatures on documents such as cheques, it is necessary to be able to accommodate such variations. This is best done by establishing some level of difference which corresponds to an acceptable level of probability that two signatures were written by the same person. The method of elastic matching described in our co-pending application GB 2,252,391A also can be used in the present invention.

Figure 7:
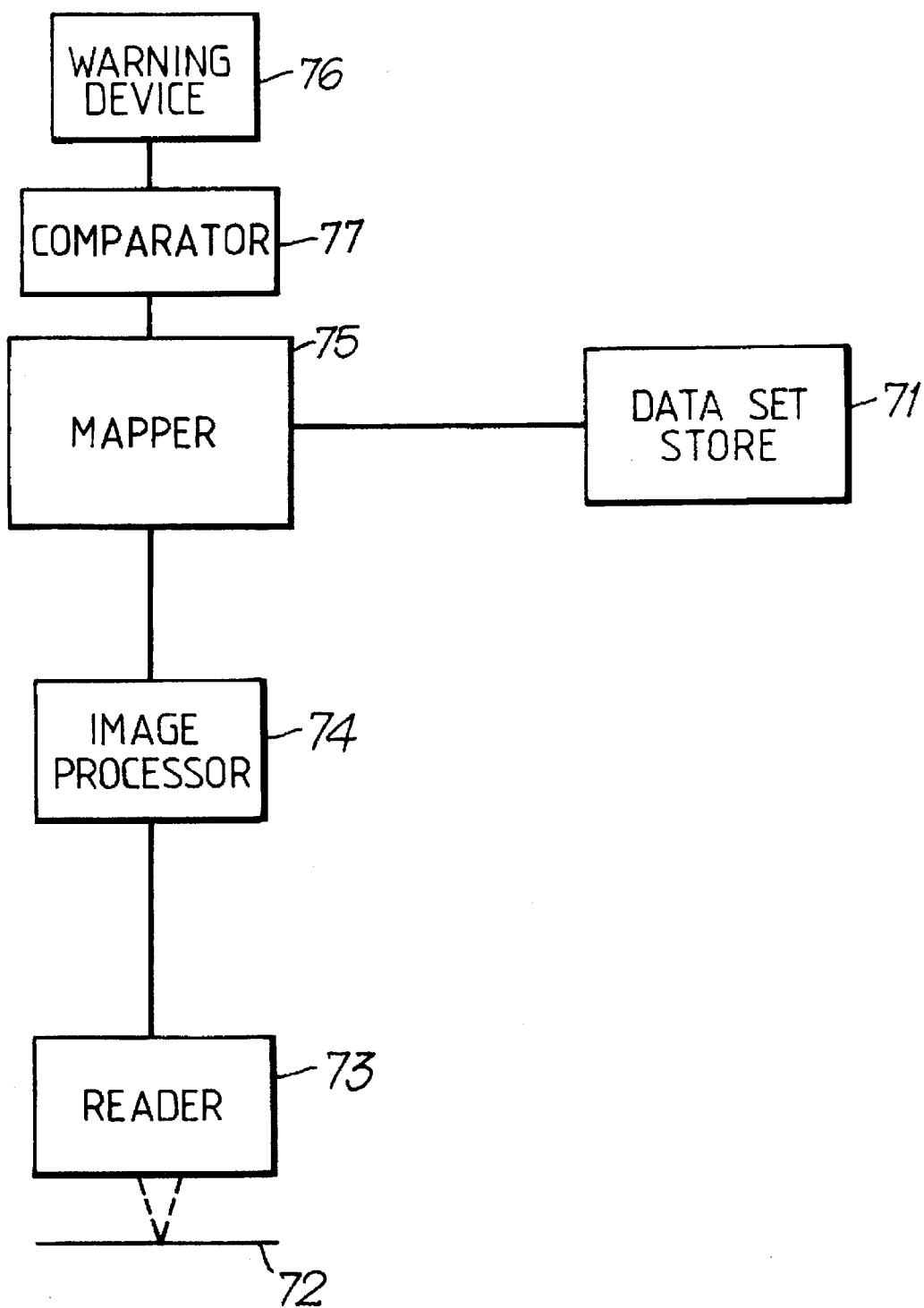
FIG. 7 shows a block diagram of a system embodying the invention for comparing two nominally identical entities.

Referring to FIG. 7, which shows a system for verifying signatures on cheques, an authentic signature held by a cheque-issuing institution is processed as described above and the data set corresponding to its extracted arcs is held in a store 71. A cheque 72, the signature upon which is to be verified is scanned by a reader 73. The reader 73 may be adapted to provide digital output signals corresponding to an array of pixels, or the image processor 74 may be adapted to carry out the appropriate digitisation of the output signals from the reader 73. In the former case, a suitable form of reader is a video camera of the charge-coupled device type. The output signals from the reader 73 are fed to an image processor 74 in which they are processed to provide a second data set corresponding to the arcs contained within the signature to be verified. The data sets from the image processor are then applied to a mapper 75 in which the two data sets are matched as described previously and signals related thereto are applied to a comparator 77 which contains information relating to expected variations in data relating to repeated authentic signatures, and the probability of identity between the two signatures assessed. In the event that a signature is judged to have a probability of being fraudulent which exceeds a pre-determined amount, then a warning device 76 is activated.

As in the method of verifying signatures dynamically, disclosed in patent application 2,252,591A the comparator 75 seeks to find the best mapping array, link $(i_b)$ from arcs $i_b$ in the bank-held sample signature to arcs $i_a$ in the cheque signature.

The correlation between the arcs can be evaluated readily. As an example, the correlation will be maximised when the following function of the arc parameters V(i,j) for each arc i and variable j is minimised.

$$E_{corr} = \sum_{i=1, n_{arcs} j=3,5} \Sigma W_{(j)} [v_{bank}(i,j) - v_{cheque}\text{link}(i),j]^2$$

Where $E_{corr}$ is a correlation energy, the values of j are ranges of the arc variables of angle, curvature and length. This function ensures that arcs with similar orientation, curvature and length will give a low correlation energy. The coefficients $w_{(j)}$ are derived empirically through a learning process to be those which best discriminate between authentic and forged signatures.

A distortion energy $E_{dist}$ is defined for a set of linkages link (i). $E_{dist}$ is analogous to the elastic energy of a rubber sheet which is stretched from the (x,y) positions in the bank sample signatures to the corresponding (x,y) positions in the image of the signature under test to which they are linked at a given moment. In general, the elastic energy terms between all the arcs in the signatures will have to be calculated.

The distortion energy $E_{dist}$ is given by the equation $$E_{dist} = \sum_{i=1}^{n_{arcs}} \sum_{\substack{j=1 \\ j \neq i}}^{n_{arcs}} \left\{ \begin{array}{l} [x_{bank}(i) - x_{cheque}(\text{link}(i)) - x_{bank}(j) + x_{cheque}(\text{link}(j))]^2 + \\ [y_{bank}(i) - y_{cheque}(\text{link}(i)) - y_{bank}(j) + y_{cheque}(\text{link}(j))]^2 \end{array} \right\}$$

The minimum distortion energy clearly will occur when all the links are made from each arc in the bank sample signature to corresponding arcs in the cheque signature which have the correct x and y direction spatial relationships, both in sign and magnitude. Provision must be made for links to 'dangle' if there is no arc in the signature on the cheque to which a given arc in the bank sample cheque should be connected. In practice, not all sets of arcs need to be included in the summation, but merely a number of those nearest to a given arc. A suitable number of neighbouring arcs to be included is three. The set of linkages which give the minimum value of $E_{dist}$ can be found by one of a number of methods, including exhaustive search, gradient descent or Monte Carlo methods.

When the maximum correlation and minimum distortion energies characteristic of a particular pair of signatures have been determined, the processes of signature verification or personal identification can be performed by one of several standard methods. For example, from a database of appropriate authentic-authentic and authentic-forged signature pairs, clusters corresponding to the two classes, authentic or forged can be identified in the two-dimensional space formed by the correlation and distortion energies. By fitting Gaussian probability distributions to each class, an unknown signature pair can be identified by the class to which it is nearer when it is weighted appropriately by the relevant standard deviations.

If it is desired to identify a person from a signature, the correlation and distortion energies of this signature when mapped to all of a possible class of candidates could be determined. The pair having the lowest energies could identify the unknown signature.

The above technique also can be used to identify a person by comparing a video image of his face with a stored image. The stored image may be held in a data bank or be a photograph on a security pass or similar document.

Figure 8:
FIG. 8 shows a detail from a drawing by Matisse.

Referring to FIG. 8, it can be seen that a human face can be delineated by a relatively small number, perhaps twenty, of curved lines, albeit with subtly varying curvatures. Each of these lines can be considered as a sequence of circular arcs.

Figure 9:
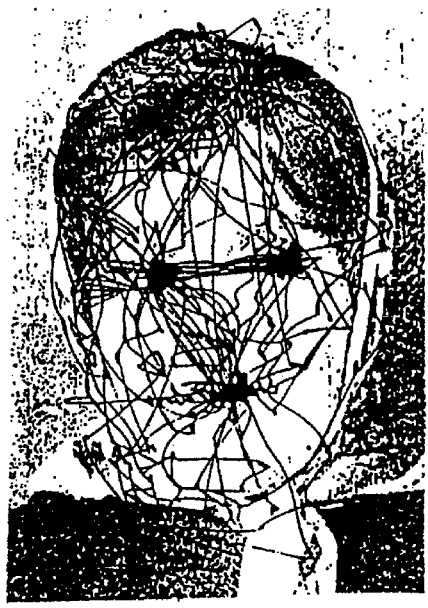
FIG. 9 shows how a person viewing a face concentrates his attention on selected regions of that face.

FIG. 9 indicates how this ability simply to delineate a face comes about. As can be seen from FIG. 9, the eyes of a person looking at another spend most of their time focused on the regions of the eyes, nose and mouth. Therefore as long as enough lines are present to encapsulate these features and the overall shape of the outline of the face, that is all that is required to produce a recognisable image of the face.

Figure 10:
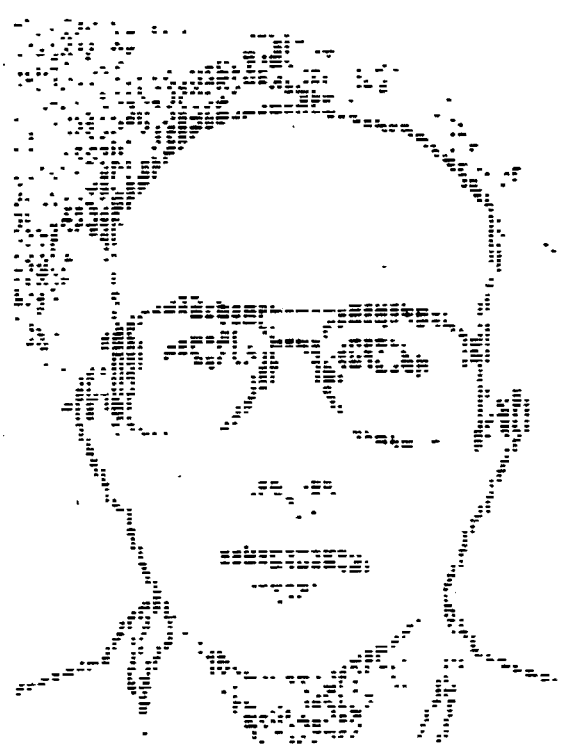
FIG. 10 shows a gradient image generated from a video camera image of a subject.

The present invention makes use of this phenomenon. A picture of an individual is produced, either photographically or by means of a video camera, and reduced to a gradient image, as shown in FIG. 10, by means of the operator $G_{(i,j)} = \{[f_{(i,j)} - f_{(i,j-1)}]^2 = [f_{(i,j)} - f_{(i,j+1)}]^2\}^{1/2}$ where the function $f_{(i,j)}$ represents the original image. As can be seen, this is constituted by a set of pixels which form lines, albeit of varying width. These are reduced to lines of constant width by choosing a point in one of the lines, surrounding it by a box of some resolution value $2R_o$ (Of the order of 10) such as to encapsulate the broader arcs in the gradient image. The centre of gravity ($i_o$, $j_o$) of that part of the gradient image and its slope $S(i_o, j_o)$ are evaluated by a standard regression technique, such as is well known in the field of image analysis. By this means a series of arcuate lines of constant width is derived.

Figure 11:
FIG. 11 shows two arc images of each of three subjects produced by the method of the present invention.

The resulting derived gradient image is then subjected to the same processing routine as was used in connection with signatures. FIG. 11 shows pairs of extracted arc images for three subjects. About 60 arcs occur in each image. It can be seen that this is quite sufficient for the human eye to recognise and compare two images of the same face.

For a non-human comparison, however, for example by a security system comparing a real-time video camera image of a person with a stored image, the situation is the same as for the signature verification situation discussed above and exactly the same matching process can be used.

Figure 12:
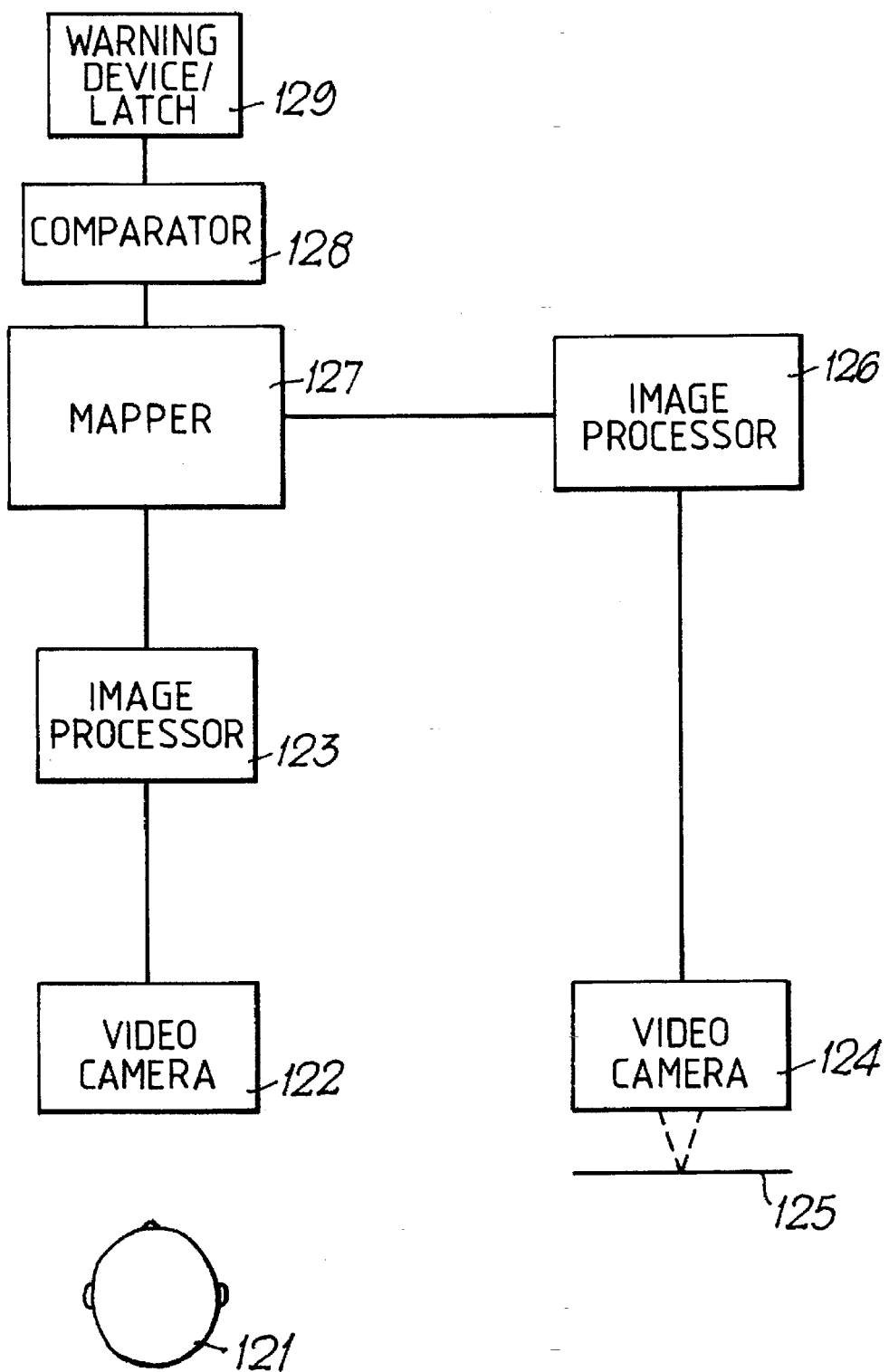
FIG. 12 shows a block diagram of a second system embodying the invention for comparing two nominally identical entities.

Referring to FIG. 12, an apparatus for enabling a person to be identified by comparing a directly-derived image of their face 121, in whole or in part, with a second image of known provenance comprises, a video camera 122, preferably of the charge-coupled device type which produces an image in the form of pixels. The output from the video camera 122 is fed to an image processor 123 which carries out the operation of reducing the photographic type image produced by the video camera 122 to the gradient and line images, previously referred to, as well as carrying out the extraction of arcs and corresponding data sets, as in the apparatus described with reference to FIG. 7. The data set store 71 is replaced by a second video camera 124 similar to the camera 122 arranged to scan an image on an identification document 125. A second image processor 126 is arranged to carry out the same operations as the image processor 123. The outputs from the image processors 123 and 126 are applied to a mapper 127 corresponding to the mapper 75 and the output from the mapper 127 is applied to a comparator 128, as before.

The output from the comparator 128 is applied to a warning device 129 which may include an automatic latch (not shown) for a door or a security barrier.

If desired, the image processor 126 can be omitted and the image processor 123 used in multiplex fashion. Also, the second video camera and image processor can be replaced by a previously prepared data set store as in the apparatus described with reference to FIG. 7.

I claim:

1. A method of comparing two nominally identical entities a first one of which is designated as a reference entity, comprising the operations of producing an image of the reference entity, extracting therefrom an assembly of arcs related to linear features of the image of the reference entity, producing a first data set representative of the assembly of arcs extracted from the image of the reference entity, storing the first data set, reproducing from the stored data set a plurality of the assemblies of arcs extracted from the image of the reference entity, mapping the reproduced assemblies of arcs upon one another to establish a standard level of differences between the assemblies of arcs extracted from the same image so as to establish a criterion of an acceptable level of probability of identity between two entities being compared, producing an image of the second entity, extracting therefrom an assembly of arcs related to linear features of the image of the second entity, producing a second data set representative of the assembly of arcs extracted from the image of the second entity, using the first and second data sets to reproduce assemblies of arcs extracted from the images of the reference and second entities, mapping said last mentioned reproduced assemblies one upon the other and determining the level of difference therebetween, comparing the determined level of difference between the assemblies of arcs extracted from the images of the reference and second entities with the standard level of difference between the repeated mappings of the assemblies of arcs extracted from the reference entity image to establish the level of probability of identity between the entities, and providing an indication of the acceptance or rejection of the proposition that the two entities are identical.

2. A method according to claim 1 wherein the mapping between the plurality of assemblies of arcs extracted from the image of the reference entity to establish the standard level of differences between the said assemblies to establish the criterion of an acceptable level of probability of identity between the two nominally identical entities is done in the same manner as that between the two assemblies of arcs related to linear features of the images of the two nominally identical entities.

3. A method according to claim 1 wherein the operation of mapping one set of reproduced arcs upon the other is carried out in such a manner as to maximize the correlation between the representations of respective arcs in the assemblies of arcs while simultaneously minimizing elastic distortions in the mapping between the representations of the arcs.

4. A method according to claim 1, wherein the assembly of arcs is extracted from each image by scanning the image to produce a plurality of pixels, determining whether a pixel chosen at random contains an element of a linear feature of the image and if it does recording the coordinates of the center of that pixel, constructing about the pixel a first area having a size approximately equal to twice the thickness of an expected linear feature of the image and centered upon the pixel, determining a best fit straight line to pixels in the first area containing elements of a linear feature of the image, the said straight line defining a first segment of an extracted arc, estimating therefrom the coordinates of the center of a similar area adjacent the first area and containing another segment of the linear feature of the image represented by the pixels containing elements of the linear feature of the image, determining the best fit straight line to the elements of the linear feature of the image represented by the pixels in the second area to yield a possible second segment of the extracted arc, determining:

a) whether the possible second segment of extracted arc is of similar width to the first segment of extracted arc, b) whether the possible second segment of extracted arc joins onto the first segment with a transverse displacement of less than half a line width and c) whether the possible second segment of extracted arc joins the first segment of extracted arc at an angle with reference to the first segment of extracted arc which is within a predetermined value so that the segments of extracted arc at least approximate to an arc of constant curvature;

accepting the best fit straight line as representing part of an extracted arc if the above criteria are satisfied, repeating the arc extraction operation in one direction until the above criteria no longer are satisfied, repeating the arc extraction operation in the reverse direction until the above criteria also no longer are satisfied, temporarily storing data generated during the determination of the possible segments of the extracted arc, determining whether the length of the possible extracted arc exceeds a predetermined value and if it does, determining the coordinates of the center of the extracted arc, the angle of the tangent to the extracted arc at its center, the curvature of the extracted arc and the chordal length of the extracted arc, storing these parameters, deleting the pixels from the image, repeating the arc extraction operation in other parts of the image until the entire image has been processed, and storing the above parameters of the extracted arcs to form the said data set relating to the image.

5. A method according to claim 1 wherein the entities are signatures the first of which is known to be authentic.

6. A method according to claim 1, wherein the entities to be compared are images of at least portions of faces and there is included the operation of reducing the images to assemblages of curved lines related to localized variations in the shape of regions of the said portions of faces.

* * * * *